(12) United States Patent
Shaw et al.

(10) Patent No.: US 10,817,792 B2
(45) Date of Patent: Oct. 27, 2020

(54) MONITORING STREAMING RELATED TO CONNECTIVITY

(71) Applicant: Piksel, Inc., Wilmington, DE (US)

(72) Inventors: Philip Shaw, York (GB); Peter Heiland, Dover, MA (US); Hans-Jurgen Maas, Mainz (DE); Sean Everett, New York, NY (US); Ralf Tillmann, Mannheim (DE)

(73) Assignee: PIKSEL, INC., Wilmington, DE (US)

(*) Notice: Subject to any disclaimer, the term of this patent is extended or adjusted under 35 U.S.C. 154(b) by 0 days.

(21) Appl. No.: 16/074,241

(22) PCT Filed: Feb. 1, 2017

(86) PCT No.: PCT/EP2017/052176
§ 371 (c)(1),
(2) Date: Jul. 31, 2018

(87) PCT Pub. No.: WO2017/134119
PCT Pub. Date: Aug. 10, 2017

(65) Prior Publication Data
US 2019/0320229 A1    Oct. 17, 2019

Related U.S. Application Data

(60) Provisional application No. 62/289,731, filed on Feb. 1, 2016.

(51) Int. Cl.
*H04N 21/238* (2011.01)
*G06N 5/04* (2006.01)
(Continued)

(52) U.S. Cl.
CPC ............ *G06N 5/04* (2013.01); *G06Q 20/12* (2013.01); *H04N 21/4122* (2013.01);
(Continued)

(58) Field of Classification Search
CPC .................................................. H04N 21/238
See application file for complete search history.

(56) References Cited

U.S. PATENT DOCUMENTS

2001/0037360 A1    11/2001    Ekkel
2002/0138625 A1    9/2002    Bruner
(Continued)

FOREIGN PATENT DOCUMENTS

EP    0 780 758 A2    6/1997
EP    1209928 A2    5/2002
(Continued)

OTHER PUBLICATIONS

Lind, et al., "The Network Vehicle—A Glimpse Into the Future of Mobile Multi-Media", IEEE Aerospace and Electronic Systems Magazine, vol. 14, No. 9, Sep. 1, 1999.
(Continued)

*Primary Examiner* — Michael H Hong
(74) *Attorney, Agent, or Firm* — Holzer Patel Drennan

(57) ABSTRACT

The invention relates to a method of delivering content to a device, comprising: receiving a prediction of a context of the device; determining a communication profile for the device based on the predicted context; receiving an identification of content to be transferred to the device; and planning a data transfer to the device in dependence on the communication profile of the predicted context and the identified content. Adjusting data transfer in a vehicle based on download volume forecast.

18 Claims, 11 Drawing Sheets

(51) Int. Cl.
  *G06Q 20/12* (2012.01)
  *H04N 21/45* (2011.01)
  *H04N 21/41* (2011.01)
  *H04N 21/442* (2011.01)
  *H04N 21/462* (2011.01)

(52) U.S. Cl.
  CPC ... *H04N 21/4126* (2013.01); *H04N 21/44209* (2013.01); *H04N 21/4516* (2013.01); *H04N 21/4524* (2013.01); *H04N 21/462* (2013.01); *H04N 21/238* (2013.01)

(56) References Cited

U.S. PATENT DOCUMENTS

| | | |
|---|---|---|
| 2002/0178451 A1 | 11/2002 | Ficco |
| 2003/0065712 A1* | 4/2003 | Cheung .................. H04L 29/06 709/203 |
| 2006/0156209 A1 | 7/2006 | Matsuura |
| 2006/0293064 A1 | 12/2006 | Robertson et al. |
| 2007/0219708 A1 | 9/2007 | Brasche |
| 2009/0024749 A1 | 1/2009 | Harrang et al. |
| 2010/0017121 A1 | 1/2010 | Diaz et al. |
| 2010/0114408 A1 | 5/2010 | Goossen |
| 2010/0214923 A1 | 8/2010 | Vivanco et al. |
| 2012/0009890 A1* | 1/2012 | Curcio .................. H04L 29/06 455/230 |
| 2012/0173356 A1 | 7/2012 | Fan |
| 2014/0223478 A1 | 8/2014 | Ogilvie |
| 2014/0362823 A1 | 12/2014 | Fuabashi et al. |
| 2015/0074003 A1 | 3/2015 | Tickner |

FOREIGN PATENT DOCUMENTS

| | | |
|---|---|---|
| EP | 1517505 A2 | 3/2005 |
| EP | 2120014 A1 | 11/2009 |
| EP | 2 680 574 A2 | 1/2014 |
| EP | 2811747 A1 | 12/2014 |
| EP | 2 942 971 A1 | 11/2015 |
| JP | 2006197441 A | 7/2006 |
| WO | 03/021909 A1 | 3/2003 |

OTHER PUBLICATIONS

International Search Report and Written Opinion, European Patent Office, dated Mar. 15, 2017.
Examination Report from European Patent Office for corresponding EP application 17702861.0, dated May 24, 2019.
Summons to attend Oral Proceedings from European Patent Office for corresponding EP application 17702861.0, dated Apr. 17, 2020.
Wikipedia, "Quality of Service," downloaded Mar. 25, 2020.
Wikipedia, "Adaptive bitrate streaming," downloaded Mar. 25, 2020.

* cited by examiner

MONITORING STREAMING RELATED TO CONNECTIVITY

BACKGROUND TO THE INVENTION

Field of the Invention

The invention relates to managing of data transfer from one device such as a server to another device such as a mobile device during a period of time, taking into account one or more data transfer rates available during that period of time and the required data transfer rate in order to allow playback of transferred content.

Description of the Related Art

It is known to transfer content to a user device, by downloading or streaming, in order to allow the user to watch the content.

When watching videos on a connected device, or performing some other activity on a device that needs considerable bandwidth, it follows that a connection which suffers from either variable throughput or periods of no connectivity at all can provide a problem. A user device can suffer degradations in performance as a result of such a situation.

It is an aim to provide a modified technique for transferring data to a user device.

SUMMARY OF THE INVENTION

In one aspect there is provided a method of delivering content to a device, comprising: receiving a prediction of a context of the device; determining a communication profile for the device based on the predicted context; receiving an identification of content to be transferred to the device; and planning a data transfer to the device in dependence on the communication profile of the predicted context and the identified content.

The communication profile may be a data connectivity of the device for the context.

Planning the data transfer to the device may comprise determining a varying of the rate for transferring content.

Planning the data transfer may comprise varying the transfer rate of content to ensure that the content will be transferred completely during a period of time of the predicted context.

Planning the data transfer may comprise varying the transfer bit rate for the content to ensure that the content can be consumed in accordance with a playback rate in a specified time period.

Determining the communication profile may comprise mapping locations of the predicted context against information about connectivity of those locations.

The data transfer may be adjusted if the actual communication profile during transferring the content does not match with the determined communication of the predicted context.

The step of planning the data transfer may comprise reducing the playback rate of the content, thereby requiring a reduced data transfer rate. This is exemplified by FIG. 4.

The step of planning the data transfer may comprise changing at least one of the plurality of locations. This is exemplified by FIG. 6. The method may further comprise changing at least one of the plurality of locations changes a time period associated with the context.

The step of planning the data transfer may comprise increasing the data transfer rate in one period of time to compensate for a reduced data transfer rate in a later period of time. This is exemplified by FIG. 9.

The step of planning the data transfer comprises decreasing the playback rate in one period of time to allow an increased data transfer rate in that period of time to cache content for playback in a later period of time. This is exemplified by FIG. 11.

In general, the data transfer rate is always optimised. This may be purposefully reduced because of other priorities, such as other applications requiring bandwidth also running. Despite this, there may be scenarios where a lower playback rate is operated than is available, to allow a further portion of data to be cached. Then in a later period of time when the data transfer rate is lower than desired—and may even break up for a while—content can still be provided at a reasonable playback rate.

The step of planning the data transfer may comprise decreasing the playback rate in one period of time to allow the same playback rate in a later period of time in which the data transfer rate is not sufficiently large.

The method may further comprise planning the data transfer to the device in dependence further on a communication associated with a further application requiring access to the device and consuming part of an available transfer rate to the device.

The step of planning the data transfer may comprise downloading a content required for playback prior to a playback period. Thus content may be downloaded prior to playback of content on a flight for example.

The step of planning the data transfer may comprise streaming a content required for playback such that a portion of the content to be played back is transferred prior to it being played back. Thus content may be streamed on the fly for example.

The step of planning the data transfer may comprise varying the transfer rate differently for different time periods during which the data is transferred and/or accessed for playback.

In an aspect there is provided a device for receiving content, comprising: an interface for receiving a prediction of a context of the device; a processor configured to determine a communication profile for the device based on the predicted context; an interface for receiving an identification of content to be transferred to the device; and wherein the processor is configured to plan a data transfer to the device in dependence on the communication profile of the predicted context and the identified content.

The processor may be configured to determine the communication profile based on a data connectivity of the device for the context.

The processor may be configured to plan the data transfer to the device by determining a varying of the rate for transferring content.

The processor may be configured to plan the data transfer by varying the transfer rate of content to ensure that the content will be transferred completely during a period of time of the predicted context.

The processor may be configured to plan the data transfer by varying the transfer bit rate for the content to ensure that the content can be consumed in accordance with a playback rate in a specified time period.

The processor may be configured to determine the communication profile by mapping locations of the predicted context against information about connectivity of those locations.

The processor may be configured to adjust the data transfer if the actual communication profile during transferring the content does not match with the determined communication of the predicted context.

The processor may be configured to plan the data transfer by reducing the playback rate of the content, thereby requiring a reduced data transfer rate.

The processor may be configured to plan the data transfer by changing at least one of the plurality of locations.

The processor may be configured to plan the data transfer by increasing the data transfer rate in one period of time to compensate for a reduced data transfer rate in a later period of time.

The processor may be configured to plan the data transfer by decreasing the playback rate in one period of time to allow an increased data transfer rate in that period of time to store content in a cache for playback in a later period of time.

The processor may be configured to plan the data transfer by decreasing the playback rate in one period of time to allow the same playback rate in a later period of time in which the data transfer rate is not sufficiently large.

The processor may be configured to plan the data transfer to the device in dependence further on a communication associated with a further application requiring access to the device and consuming part of an available transfer rate to the device.

The processor may be configured to plan the data transfer by downloading a content required for playback prior to a playback period.

The processor may be configured to plan the data transfer by streaming a content required for playback such that a portion of the content to be played back is transferred prior to it being played back.

The processor may be configured to plan the data transfer by varying the transfer rate differently for different time periods during which the data is transferred and/or accessed for playback.

There is disclosed a method of providing content to a plurality of user devices in an environment, comprising: providing a system device in the environment, for receiving content transferred from a remote content provided, and for delivering the transferred content to one or more of the plurality of user devices; receiving a prediction of a context of the environment during a time period; receiving an indication of the content to transfer to the one or more of the user devices during the time period; and planning a transfer of content from the remote device for the time period in dependence on the prediction and the indication.

The environment may be a vehicle.

The content may be downloaded to the system device, and streamed to the one or more user devices.

The content may be streamed to the system device, and streamed to the one or more user devices.

There is disclosed a system comprising: a central device configured to: receive content transferred from a remote device; deliver the received content to one or more user devices; receive a prediction of a context of an environment in which the central device will be in during a predicted time period; receive an indication of content to transfer the one or more user devices during the predicted time period; and plan a transfer of content from the remote device for the predicted time period in dependence on the prediction of the context and the indication of content.

In one example there is provided a method of managing streaming of content, comprising: identifying a journey of a user device; identifying, for at least part of the journey, a connection of a user device to a network to be used for streaming content to the user device; adapting the streaming of content to the user device in dependence on the identified journey and the identified connection.

Identifying the journey may comprise identifying a source and a destination for the journey.

The method may further comprise, in dependence on the identified journey, creating a connectivity map for the journey. The connectivity map may identify a connectivity quality at points along the journey.

The method may further comprise providing a plurality of routes for the journey. The plurality of routes may provide different connectivity quality. The method may further comprise selecting a provided route.

Adapting the streaming of content may comprise adjusting the streaming over a time period of the journey in dependence on connectivity during the journey. The streaming may be downloading, and wherein in dependence on a predicted portion of the journey of reduced connectivity, in advance of that portion of the journey downloading and caching content associated with that portion of the journey. The streaming may be uploading, and wherein in dependence on a predicted portion of the journey of reduced connectivity, in advance of that portion of the journey caching content associated with that portion of the journey, and uploading the cached content after that portion of the journey. The connectivity over the time period of the journey may vary in dependence on the available bandwidth for streaming varying, wherein adjusting the streaming for any time period is in dependence on the available bandwidth for that time period. Streaming may be prioritised in dependence on the bandwidth in any time period. In dependence on a predicted duration of reduced connectivity, the bitrate of the current streamed content may be reduced in order to allow the streaming of future content associated with the upcoming period of predicted reduced connectivity. There may be provided a plurality of applications running on the user device, wherein the streaming of content associated with any application is prioritised in dependence on the connectivity.

Adapting the streaming of content may comprise adjusting the route of the journey in dependence on predicted connectivity during the journey. The method may further comprise instructing a journey process to modify the journey during a period of predicted reduced connectivity to modify the journey to a route have higher connectivity.

On initiation of streaming, an application controlling the streaming may access the journey information in order to plan the streaming.

Multiple applications may be running on the user device, wherein applications are prioritised in dependence on streaming requirements and associated bandwidth needs.

The user device may be provided in a vehicle, and the vehicle is connected to a network, the connection of the user device to the network being dependent on the connection of the vehicle to the network. The user device may be connected to an intermediary device.

A plurality of user devices may connect to the intermediary device, wherein the intermediary manages connection to the network for each user device. The available bandwidth between the network and the intermediary device may be shared amongst the user devices under the control of the intermediary device. The bandwidth available to any user device may be adjusted by the intermediary device in order to prioritise streaming to/from any user device. The intermediary device may operate a navigation system in which the journey is defined. The intermediary device may be provided in a vehicle.

The method may provide a companion device in communication with the user device, wherein at least some of content is streamed to the companion device. The companion device may be a memory device. The companion device may be provided in a vehicle.

The journey time may be utilised to stream content.

Examples provide a method of managing streaming of content, comprising: identifying a journey of a user device; identifying, for at least part of the journey, a connection of a user device to a network to be used for streaming content to the user device; adjusting the streaming of content to the user device in dependence on predicted connectivity for at least part of the identified journey.

Examples provide a method of managing streaming of content, comprising: identifying a journey of a user device; identifying, for at least part of the journey, a connection of a user device to a network to be used for streaming content to the user device; adjusting the journey of the user device in dependence on predicted connectivity for at least part of the identified journey.

Examples provide a method of managing downloading of content to a user device, comprising: identifying content to be downloaded to the user device; predicting a time period available to download the content to the user device; and configuring the download of content to the user device within the time period.

The method may further comprise identifying a connection quality of a user device to a network to be used for downloading the content to the user device during the time period. The download may be configured in dependence on the connection quality. The time period may be associated with a journey of the user device, the connection quality varying over the time period as a result of the journey. The method may further comprise determining that the content cannot be downloaded to the user device in the time period, and providing a notification to the user device. The time period may be predicted on the basis of a journey to be undertaken by the user device, the downloading of the content to take place during the journey. The downloading may be completed on or before the end of the journey.

BRIEF DESCRIPTION OF THE FIGURES

The invention is now described by way of reference to the accompanying Figures, in which.

DESCRIPTION OF PREFERRED EMBODIMENTS

The invention is now described by way of reference to particular examples and embodiments. The invention is not limited to any particular example or embodiment given. In particular the invention is described with reference to the transferring of content in a journey, such as a journey conducted in a vehicle, but it would be understood that this scenario is exemplary and does not limit the scope of the invention.

Figure 1:
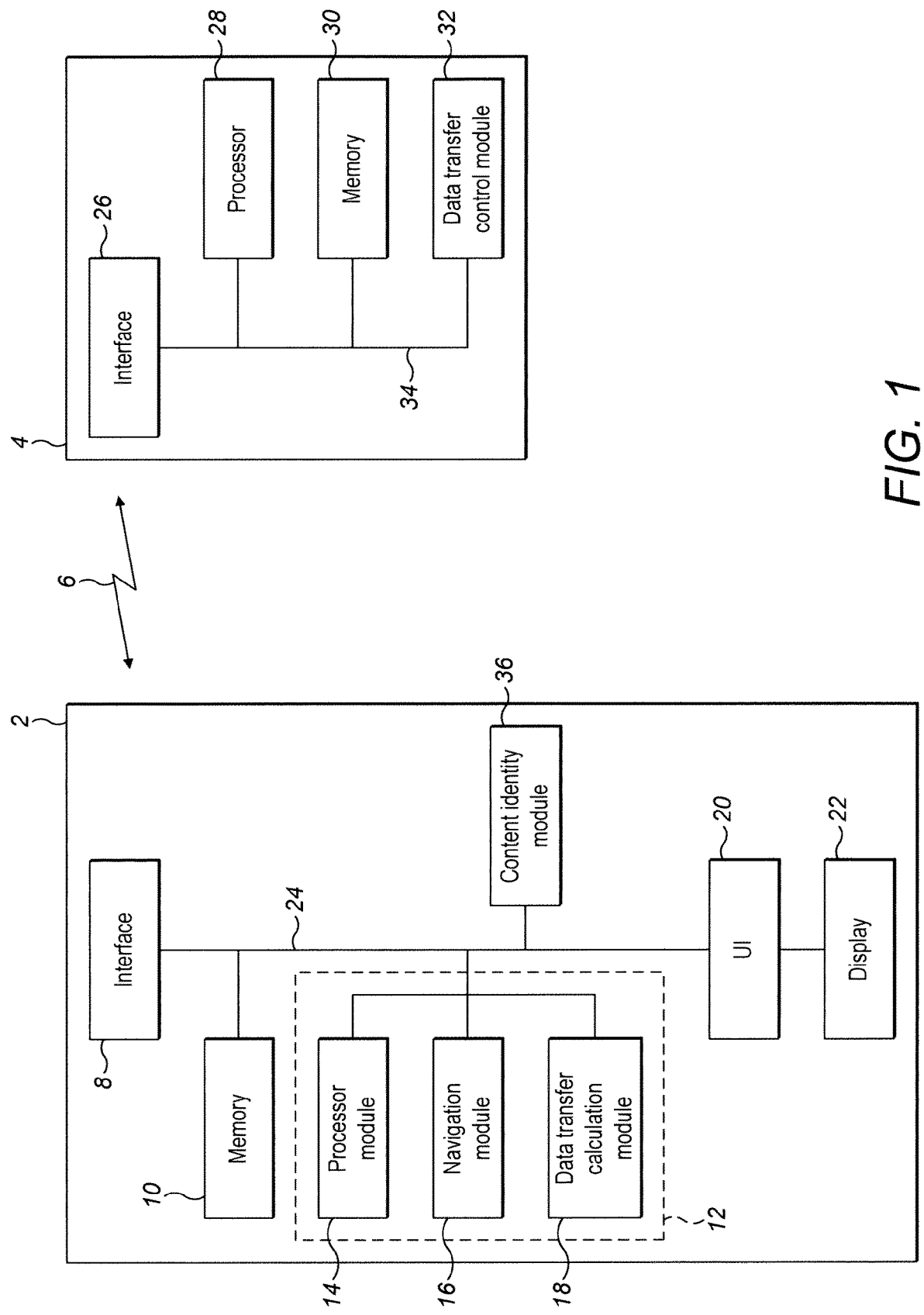
FIG. 1 illustrates the main architectural elements of a user device and a server with which it communicates for transfer of content.

With reference to FIG. 1, there is illustrated an exemplary device 2 being a mobile device such as a mobile phone or a tablet. The mobile device 2 comprises an interface 8, a memory 10, a processor 12, a content identity module 36, a user interface 20, and a display 22. All of the elements of the mobile device 2 are interconnected by a communication link 24. The processor includes a main processor module 14, a navigation module 16, and a data transfer calculation module 18, all of which are interconnected.

Also shown in FIG. 1 is a server, or some other form of central module, denoted by reference numeral 4 and comprising an interface 26, a processor 28, a memory 30, and a data transfer control module 32. All elements of the server 4 are connected by a communication link 34.

The interface 8 of the mobile device 2 and the interface 26 of the server 4 may communicate wirelessly, as indicated by the link 6.

In an implementation, the mobile device 2 is provided in a vehicle which will perform a journey. The mobile device 2 is able to provide content to a user of the mobile device during the journey, by transferring content from the server 4 across a link 6 during or before the journey, as described hereinbelow.

For the purposes of describing an example, FIG. 2(a) shows a journey which may be performed by a vehicle containing the mobile device 2. The vehicle moves from a location X at a time $t_1$ to a location Y at a time $t_4$, via location points A and B at times $t_2$ and $t_3$. The journey of the vehicle containing the mobile device may be determined by the navigation module 16, in accordance with known techniques.

Figure 2:
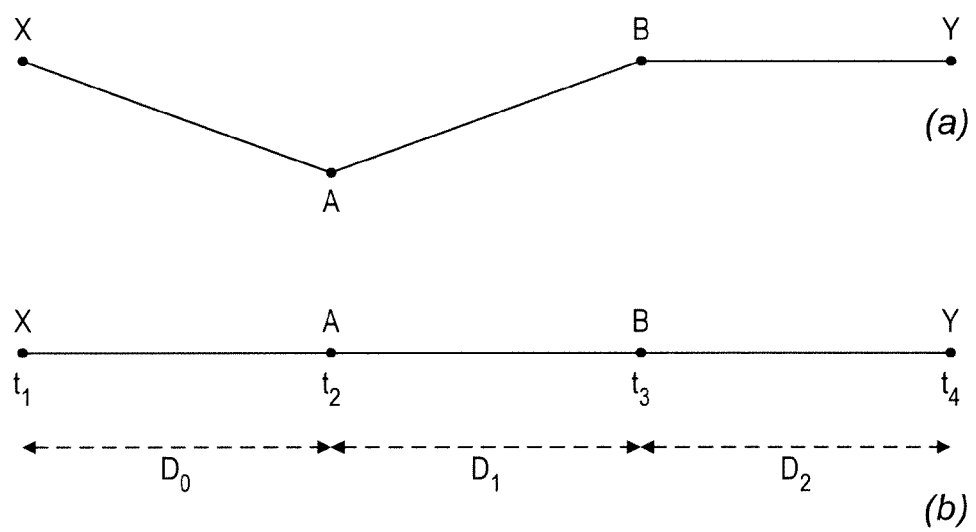
FIGS. 2(a) to 2(b) illustrate the prediction of a journey using a navigational app.

As also denoted in FIG. 2(b), different portions of the journey once predicted by the navigation module 16, may be determined by the data transfer calculation module 18 as being associated with different download bit rates. Thus as shown in FIG. 2 the portion of the journey between times $t_1$ and $t_2$ is associated with a data transfer rate $D_0$, the portion of the journey between time periods $t_2$ and $t_3$ is associated with a data transfer rate $D_1$, and the portion of the journey between time periods $t_3$ and $t_4$ is associated with a data transfer rate $D_2$.

The data transfer calculation module 18 may use the interface 8 to obtain data transfer information for the journey mapped by the navigation module.

The user of the mobile device 2 provides an input to the mobile device, via the user interface 20, of the content they wish to access during the journey. The identity of this content is stored in the content identity module 36.

The data transfer calculation module 18 then determines, based on the information stored in the content identity module 36 and based on the prediction provided by the navigation module 16, how the data transfer of content should be controlled during the journey.

Figure 3:
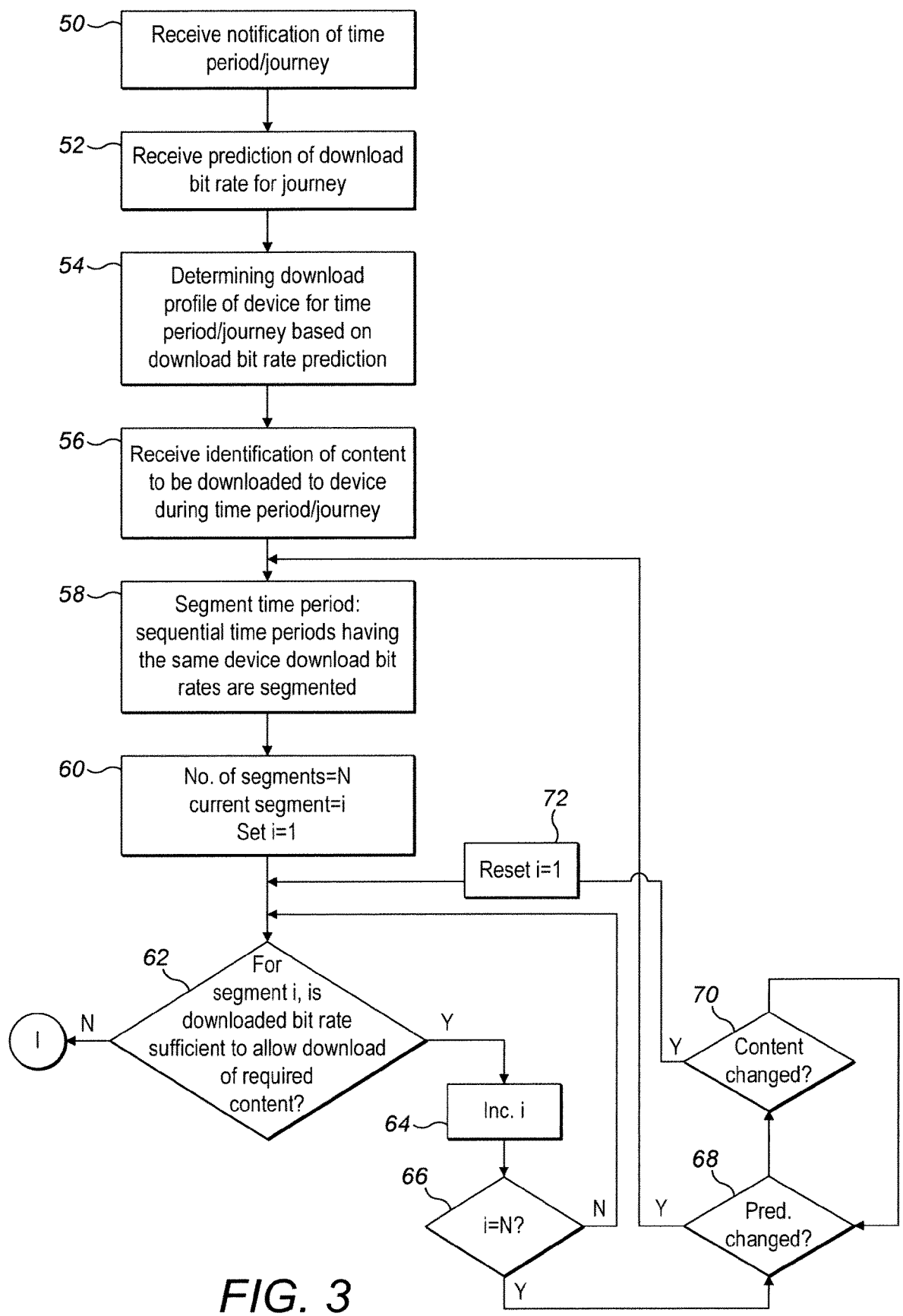
FIG. 3 illustrates a first part of a process for determining whether a transfer rate profile is sufficient.

With reference to FIG. 3, a process executed on the user device 2 is now described in more detail.

In a step 50, the data transfer calculation module receives notification of the time period for the journey, from a navigation module 16. In this example the time period is the period from $t_1$ to $t_4$. The data transfer calculation module 18 may generally receive the prediction of the route from a navigation module 16, including the physical path of the route from location X to location Y.

In a step 52 the data transfer calculation module 18 receives a prediction of the data transfer rate for transfer of content to the device for the time period $t_1$ to $t_4$, or for the journey for the location X to Y. The data transfer calculation module may obtain this by providing the navigation route to a remote server.

As denoted by step 54, the data transfer calculation module 18 then determines a data transfer profile for the device 2 for the time period $t_1$ to $t_4$ based on the data transfer rate prediction.

In a step 56, the data transfer calculation module 18 then receives the identification of the content to be transferred to the device during the time period, from the content identity module 36.

In a step 58 the data transfer module 18 then segments the time period $t_1$ to $t_4$ into a number of sequential time periods having the same device data transfer rates. Thus, in accordance with the example of FIG. 2, the time period or journey is split into three sequential portions, having data transfer rates $D_0$, $D_1$, $D_2$. These data transfer rates are different.

In a step 60 the total number of segments is set equal to N, the current segment is set equal to i, and i is set equal to 1. In the example of FIG. 2 N equals 3, and i is the segment having data transfer rate $D_0$ initially.

Thereafter in step 62, for segment i, a determination is made as to whether the data transfer rate is sufficient to allow the transfer of the desired content in this segment of the journey.

If in step 62 it is determined that the data transfer rate for the segment is sufficient to allow the transfer of the required content, then the process moves on to step 64 and i is incremented. In step 66 it is then determined whether i is equal to N. If it is not equal to N, then further segments are to be assessed, and the process returns to step 62 for performing for the subsequent segment.

If in step 66 it is determined that i is equal to N, then the process moves on to step 68.

In step 68 it is determined whether the prediction has been changed. That is, it is determined whether the prediction of the route provided by the navigation module 16 has changed. If it has changed, then the process reverts to step 58 in order for new segments to be created in accordance with the new prediction, and then steps 60, 62, 64 and 66 are repeated.

The prediction may also change based on new data transfer rate information for the existing route being provided.

If in step 68 it is determined that the prediction has not changed, then the process moves on to step 70 and it is determined whether the content has changed. This step determines whether the content required by the user, and as identified in module 36, has changed. If this content has changed, then the process reverts to step 62, and for a given segment it is determined whether the data transfer rate is sufficient, after resetting the value of i to 1 in step 72.

If it is determined in step 70 that the content has not changed, then the process reverts to step 68. Steps 68 and 70 are repeated to monitor for changes.

If in step 62 it is determined that the data transfer rate for a segment is not sufficient to allow transfer of the required content, then the process moves on as described below. There are described four possible processes following a determination that the data transfer rate is not sufficient.

Following a determination in step 62 that the data transfer rate is insufficient, then the process moves on to a number of possible further processes as denoted by numeral 1. Each of these processes is referred to as process A to process D respectively.

Figure 4:
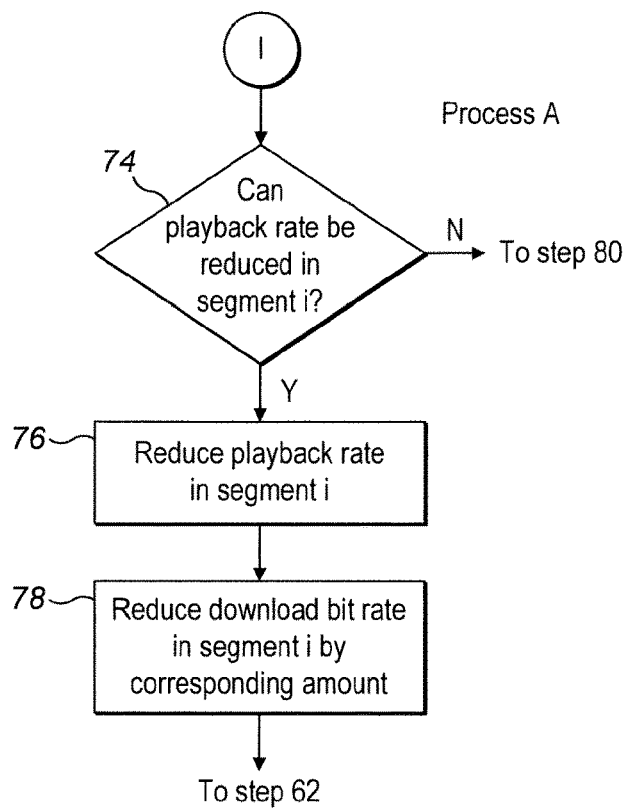
FIG. 4 illustrates a first part of an addition to the process of FIG. 3.

FIG. 4 illustrates process A following on from step 62. In step 74 of process A, it is determined whether the playback rate of the content in segment i can be reduced. If in step 74 it is determined that the playback rate cannot be reduced in segment i, then the process moves on to step 80 of process B. This is an example.

If the playback rate in segment i can be reduced, then the process moves on to step 76 and the playback rate in segment i is reduced.

Following a reduction of the playback rate in segment i, then in step 78 the data transfer rate in segment i may also be reduced in view of the reduced playback rate.

Thereafter the process reverts to step 62, and a determination is made as to whether the data transfer rate for segment i is sufficient given the fact that the data transfer rate has now been reduced.

Figure 5:
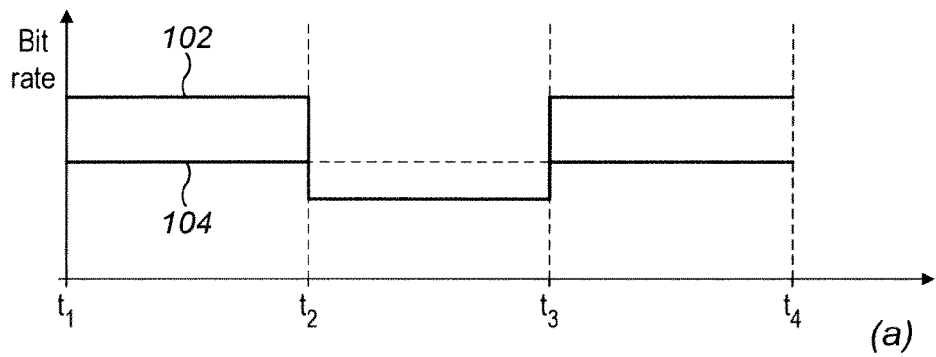
FIGS. 5(a) and 5(b) illustrate the purpose of the process of FIG. 4.
Figure 5:
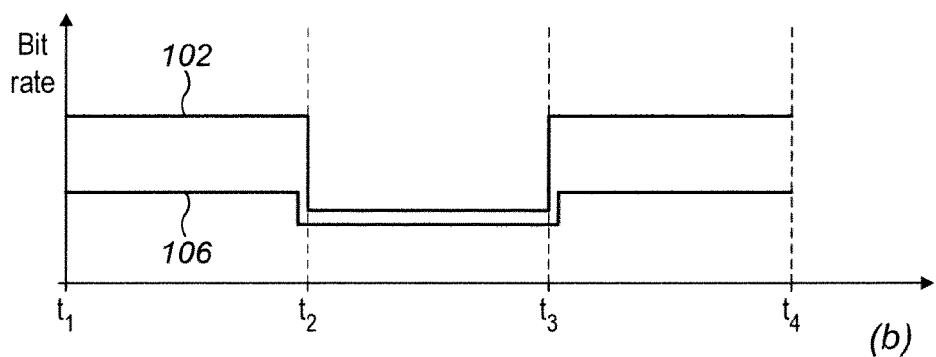

With reference to FIG. 5, there is illustrated the reduction of the data transfer rate in accordance with process A of FIG. 4. As shown in part (a) of FIG. 5, there is illustrated a plot of data transfer rate against time for the journey. Reference numeral 102 denotes the available data transfer rate, and reference numeral 104 denotes the required data transfer rate in order to achieve the necessary playback rate.

The playback rate itself is not shown.

As is seen, the available data transfer rate is above the necessary data transfer rate in the time segments from $t_1$ to $t_2$ and $t_3$ to $t_4$. However in the time segment from $t_2$ to $t_3$ the available data transfer rate 102 falls below the necessary data transfer rate 104, which is denoted by a dash line in this segment.

In accordance with the process A of FIG. 4, the playback rate in segment i, being the segment between times $t_2$ and $t_3$ in FIG. 5(a), is reduced. As such, the data transfer rate needed in the segment between times $t_2$ and $t_3$ is also reduced. Thus as shown in FIG. 5(b), the available bit rate 102 remains the same, but the data transfer rate 106 is adjusted such that between times $t_2$ and $t_3$ it is reduced to a level below the available data transfer rate, to allow the data transfer rate to be provided to meet the reduced playback rate.

Figure 6:
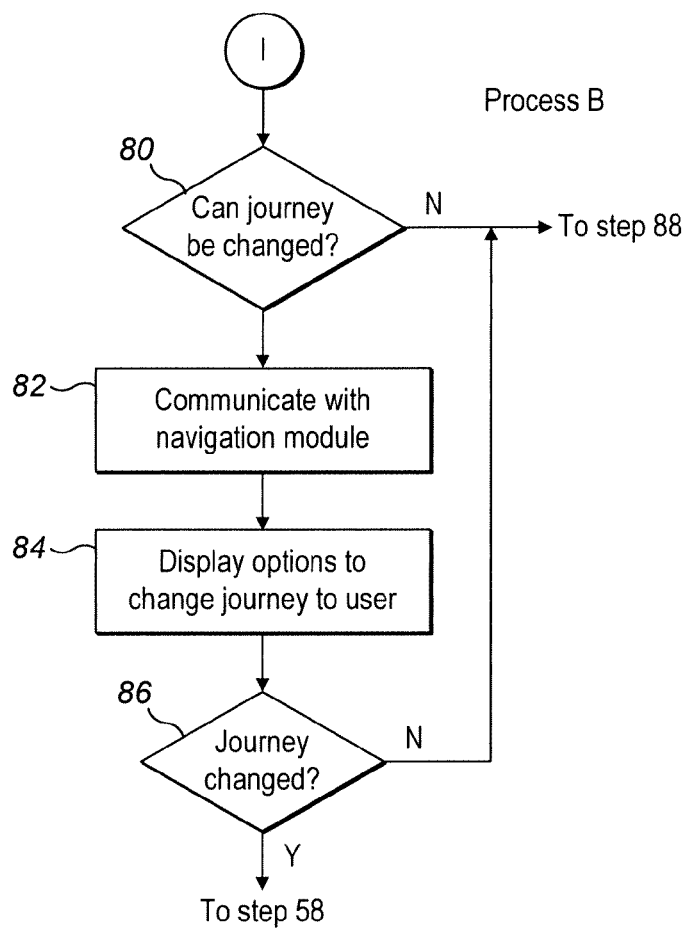
FIG. 6 illustrates a second additional part to the process of FIG. 3.

FIG. 6 illustrates process B following on from step 62. In step 80 of process B, it is determined whether the journey can be changed. If in step 80 it is determined that the journey cannot be changed, then the process moves on to step 88 of process C. This is an example.

If the journey can be changed, then the process moves on to step 82 and the data transfer calculation module 18 communicates with a navigational module 16.

Figure 7:
FIGS. 7(a) to 7(b) illustrate the prediction of a journey using a navigational app.
Figure 7:
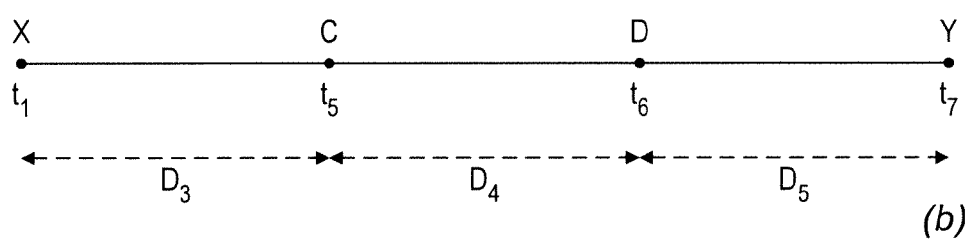

In FIGS. 2(a) and 2(b), an example has been given of a journey. With reference to FIG. 7(a), there is shown an alternative journey in order to travel from location X to location Y, via locations C and D. Thus the journey of FIG. 7(a) is the same as FIG. 2(a) insofar as the start and finish points are the same, but it has changed in terms of the navigation to get from point X to Y. FIG. 7(b) shows the journey of FIG. 7(a) in terms of time periods and download rates. As shown in FIG. 7(b) there is now a time period between $T_1$ and $t_5$ having a data transfer rate of $D_3$, a time period between $t_5$ and $t_6$ having a data transfer rate of $D_4$, and a segment between $t_6$ and $t_7$ having a data transfer rate of $D_5$.

As denoted by step 84 of FIG. 6, the display of the user device is used to display options to change the journey to the user. One or more alternative journeys may be displayed. Only the portion of the journey to which the current segment corresponds may be provided as having an alternative, or the whole journey or the remaining journey may be provided as an alternative.

In a step 86 it is then determined as to whether or not the journey has been changed. If the journey has not been changed then the process moves on to step 88. If the journey has been changed then the process returns to step 58 of FIG. 3.

Figure 8:
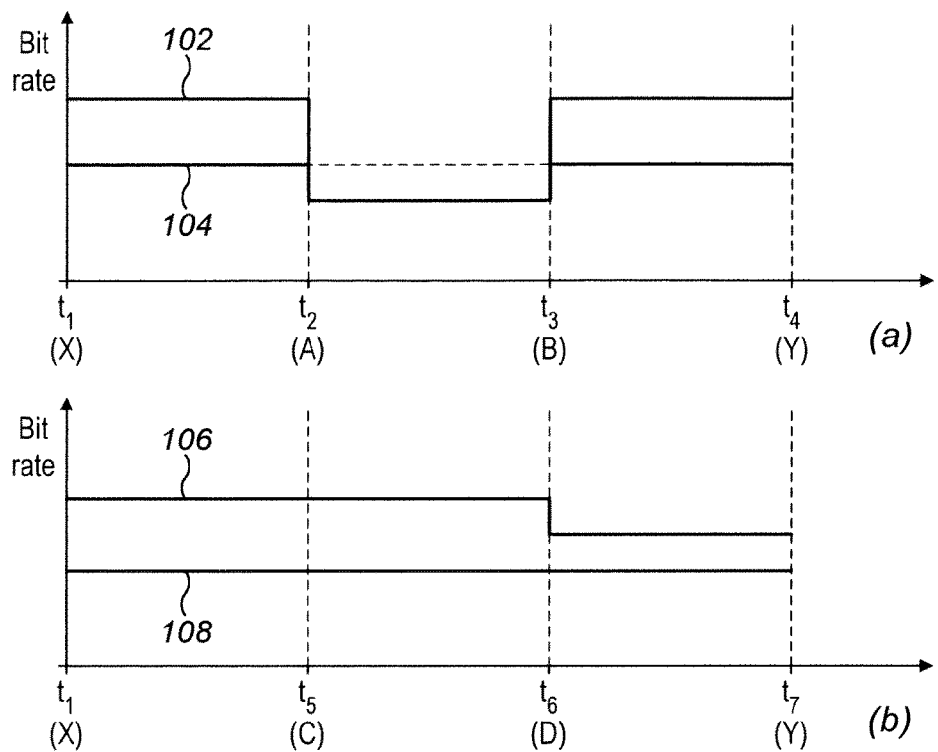
FIGS. 8(a) and 8(b) illustrates the operation of the part of the process of FIG. 6.

With reference to FIG. 8 there is illustrated the change of a journey in accordance with process B of FIG. 6. As shown in part A of FIG. 8, there is illustrated a plot of bit rate against time for the journey. Reference numeral 120 denotes the available data transfer rate, and the reference numeral 104 denotes the required data transfer rate in order to achieve the necessary playback bit rate. The playback bit rate itself is not shown.

As is seen, the available data transfer rate is above the necessary data transfer rate in the time segments from $t_1$ to $t_2$ and $t_3$ to $t_4$. However in the time segment from $t_2$ to $t_3$ the available data transfer rate 102 falls below the necessary data transfer rate 104, which is denoted by a dash line in this segment.

Figure 9:
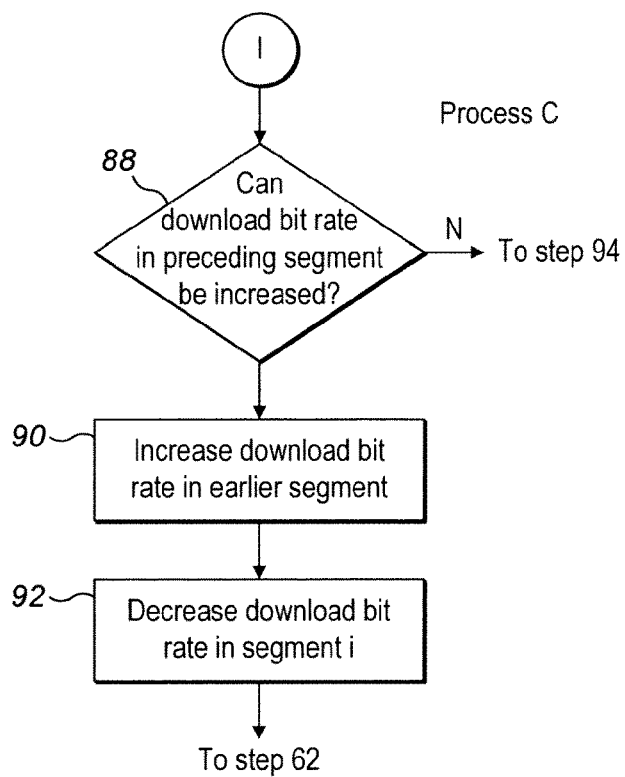
FIG. 9 illustrates a third additional part to the process of FIG. 3.

In accordance with the process B of FIG. 6, a new journey is selected. As shown in part B of FIG. 8, there is again illustrated a plot of bit rate against time for the journey. Reference numeral 106 denotes the available data transfer rate, and reference numeral 108 denotes the required data transfer rate in order to achieve the necessary playback bit rate. As is seen, the available data transfer rate is above the necessary data transfer rate in all time segments. FIG. 9 illustrates process C following on from step 62. In step 88 of process C, it is determined whether the data transfer rate in a preceding segment can be increased. If in step it is determined that the data transfer rate in a preceding segment cannot be increased, then the process moves on to step 94 of process D. This is an example.

If the data transfer rate in a preceding segment can be increased, then the process moves on to step 90. In step 90 the data transfer rate in an earlier segment is increased. Following in step 92, the data transfer rate in the current segment (segment from $t_2$ to $t_3$) is decreased.

The increase of the data transfer rate in an earlier segment, means that the content necessary to be transferred in the current segment can be partially transferred in a preceding segment, and therefore the amount of content to be transferred and the current segment can be reduced. Thus the data transfer rate in the current segment can be reduced.

Following step 92, the process returns to step 62.

Figure 10:
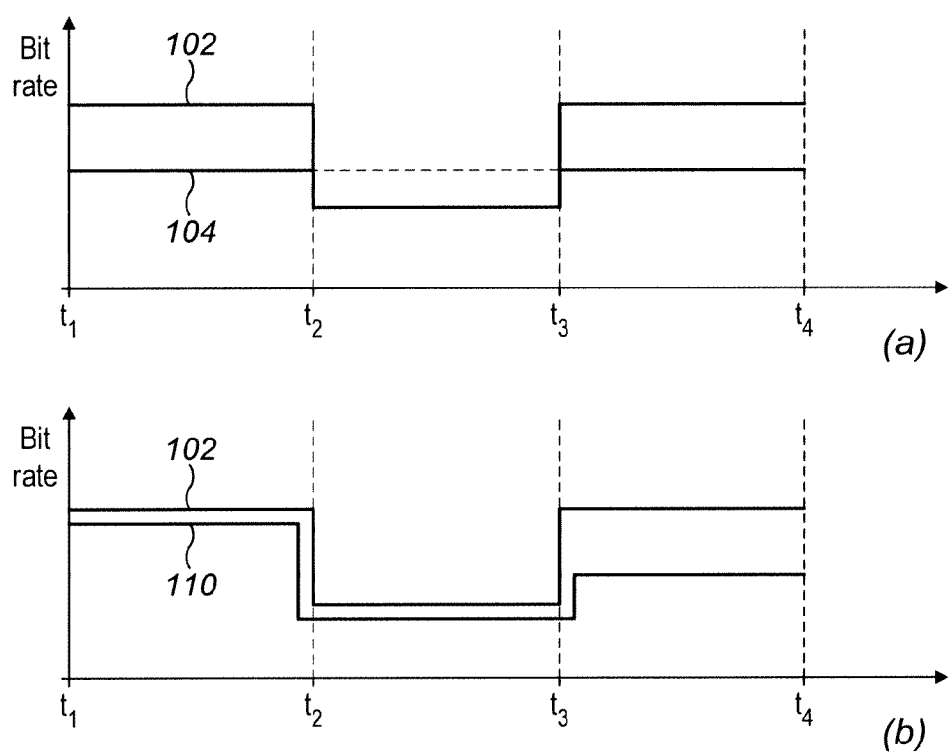
FIGS. 10(a) and 10(b) illustrate the additional process of FIG. 9.

With reference to FIG. 10, there is illustrated the increase in data transfer rate in a preceding segment in accordance with process C of FIG. 9. As shown in part A of FIG. 10, there is illustrated a plot of data transfer rate against time for the journey. Reference numeral 102 denotes the available data transfer rate, and reference numeral 104 denotes the required data transfer rate in order to achieve the necessary playback rate. The playback bit rate itself is not shown.

As is seen, the available data transfer rate is above the necessary data transfer rate in the time segments from $t_1$ to $t_2$ and $t_3$ to $t_4$. However in the time segment from $t_2$ to $t_3$ the available data transfer rate 102 falls below the necessary data transfer rate 104, which is denoted by a dash line in the segment.

In accordance with the process C of FIG. 9, the data transfer rate in the segment from times $t_1$ to $t_2$ is increased, and the data transfer rate in the segment between times $t_2$ and $t_3$ can therefore be reduced. Thus as shown in FIG. 10(b), the available bit rate 102 remains the same, but the data transfer rate 110 is adjusted such that between times $t_1$ and $t_2$ it is increased and between times $t_2$ and $t_3$ it is reduced, to allow the data transfer rate to be provided to meet the playback bit rate.

Figure 11:
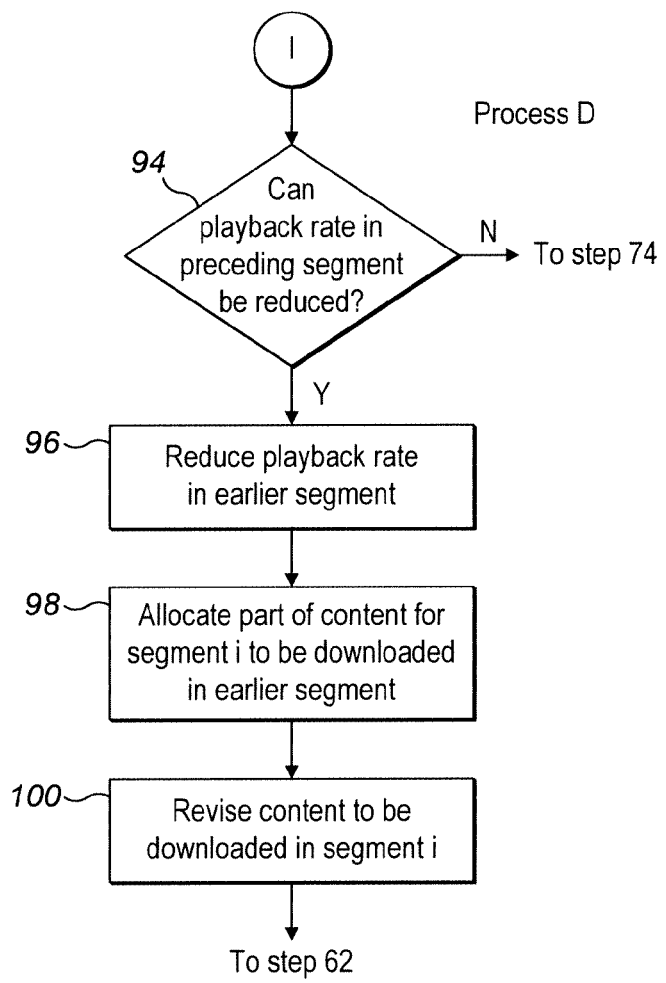
FIG. 11 illustrates a fourth additional part to the process of FIG. 3.

FIG. 11 illustrates process D following on from step 62. In step 94 of process D, it is determined whether the playback rate in a preceding segment can be reduced. If in step 94 it is determined that the playback rate cannot be reduced in segment i, then the process moves on to step 74 of process A. This is an example.

If the playback rate in a preceding segment can be reduced, then the process moves on to step 96. In step 96 the playback rate in the earlier segment is reduced.

In a following step 98, the part of the content for segment i to be transferred in the earlier segment is allocated to the earlier segment.

In a step 100 the content to be transferred in segment i itself is revised. As part of this content is now being transferred in an early segment, the volume of content to be transferred in the current segment is reduced.

Thereafter the process reverts to step 62, and a determination is made as to whether the data transfer rate for segment i is sufficient given the fact that the data transfer rate has now been reduced.

Figure 12:
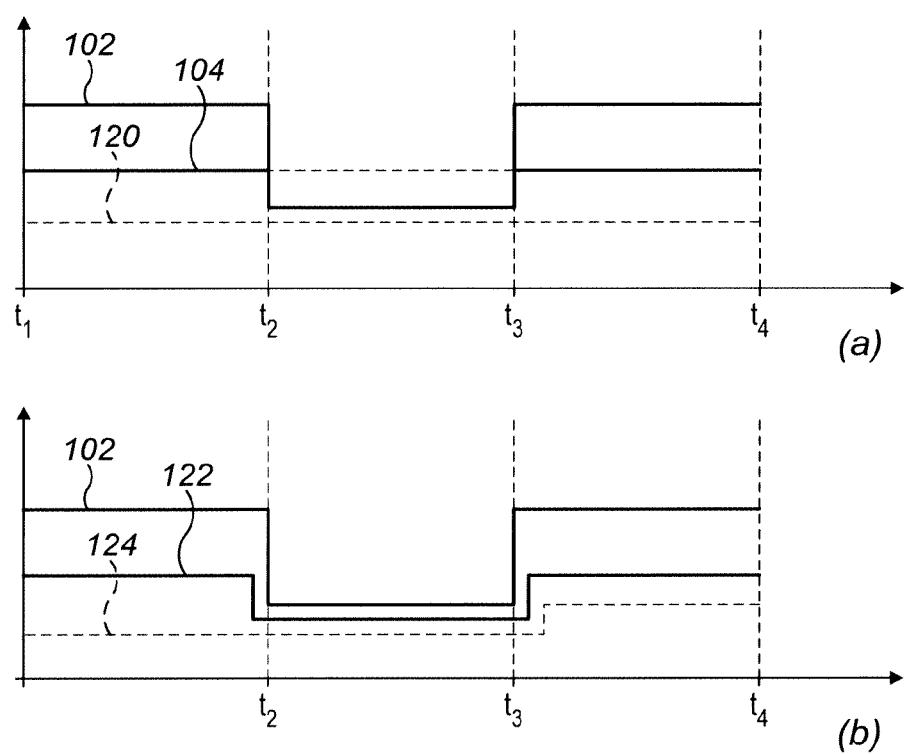
FIGS. 12(a) and 12(b) illustrate the implementation of the process of FIG. 11.

With reference to FIG. 12, there is illustrated the reduction of playback rate in a preceding segment in accordance with process D of FIG. 11. As shown in part A of FIG. 12, there is illustrated a plot of bit rate against time for the journey. Reference numeral 102 denotes the available data transfer rate, and the reference numeral 104 denotes the required data transfer rate in order to achieve the necessary playback bit rate. The playback bit rate is shown in FIG. 12(a) by dash line 120.

As is seen, the available data transfer rate is above the necessary data transfer rate in the time segments from $t_1$ to $t_2$ and $t_3$ to $t_4$. However in the time segment from $t_2$ to $t_3$ the available data transfer rate 102 falls below the necessary data transfer rate 104, which is denoted by a dash line in this segment.

In accordance with the process D of FIG. 11, the playback rate in an earlier segment (prior to the segment between times $t_2$ and $t_3$) is reduced. As such the data transfer rate in this segment can transfer additional contents required for the segment between times $t_2$ and $t_3$. Thus as shown in FIG. 12(b), the available bit rate 102 remains the same, but the data transfer rate 122 in the segment $t_1$ to $t_2$ remains the same, and is reduced in the time period $t_2$ to $t_3$. The playback bit rate in the time period $t_1$ to $t_2$ is reduced as denoted by reference numeral 124, and remains this reduced rate through the time period $t_2$ to $t_3$. It then reverts to the same level as FIG. 12(a) in the time period $t_3$ to $t_4$.

In the above example, it has been described in the context of a user device being provided in a vehicle during a journey, with the user device providing management of the data transfer rate during the journey to the user device.

In an alternative implementation, an in-car system may be provided, with one or more user devices being provided in the car. The transfer of content from a remote server is between the in-car system and the remote server, and then one or more user devices communicate with the in-car system in order to access content. The in-car system operates to control transfer from external servers to itself, in order to manage the delivery of content from itself to one or more user devices.

Figure 13:
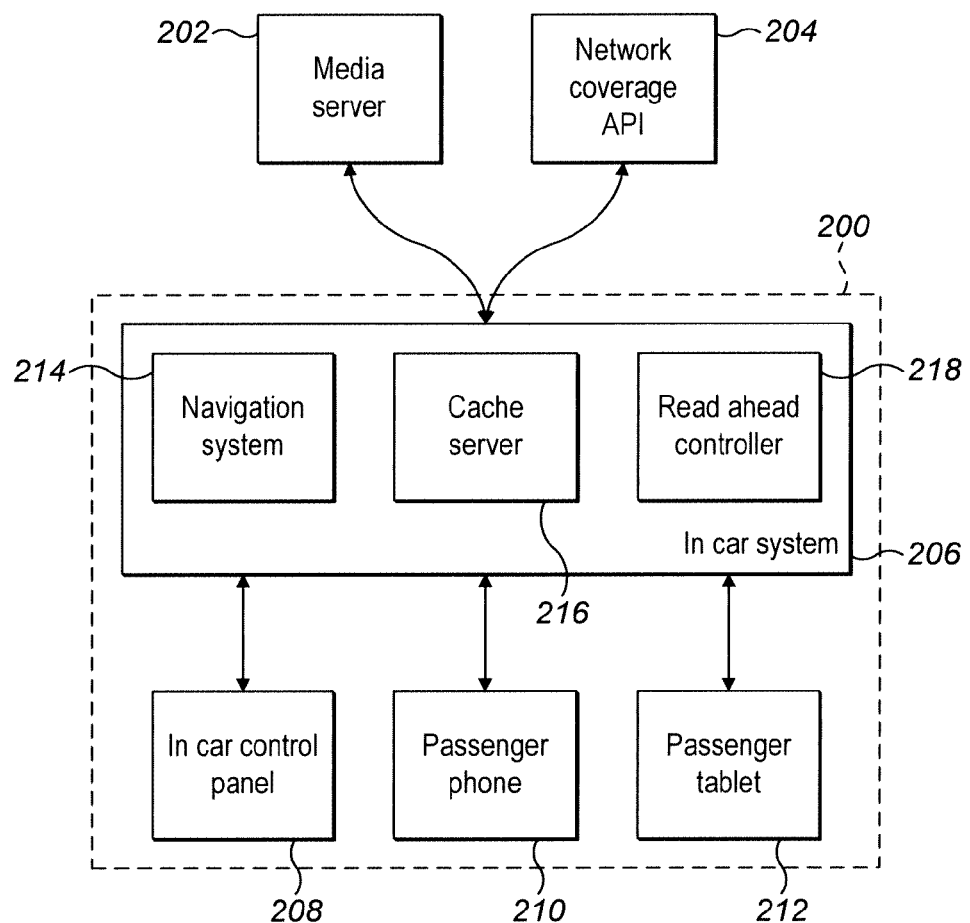
FIG. 13 illustrates an exemplary implementation of an in-car system.

With reference to FIG. 13, reference numeral 200 denotes generally a vehicle, such as a car. Within the vehicle 200 there is provided an in-car system 206, which includes a navigation system 214, a cache server 216, and a read ahead controller 218.

The in-car system 206 is connected to one or more devices, such as an in-car control panel 208, a passenger phone 210, a passenger tablet 212. Additional devices may also be provided.

The in-car system 206 is additionally in connection with a media server 202 and a network coverage API 204 which are provided external to the vehicle. The media server 202 and network coverage API 204 may connect with the in-car system 206 using cellular connections or Wi-Fi hotspots where available.

Each of the exemplary devices 208, 210, 212 use an in-car Wi-Fi in order to communicate with the in-care system 206.

The read ahead controller 218 monitors the planned route, which may be provided by the navigation system 214, and likely network coverage for the planned route provided externally by the network coverage API 204. The read ahead controller 218 also has access to the content being consumed or intended to be consumed for the journey. The read ahead controller 218 uses the network coverage of the planned route and the content being consumed or to be consumed in order to determine what content to transfer early.

Alternatively the devices 208, 210, 212 may transfer using their own cellular connections, but using the in-car read ahead controller 218 of the in-car system 206 for intelligence on their individual rates of transfer.

Figure 14:
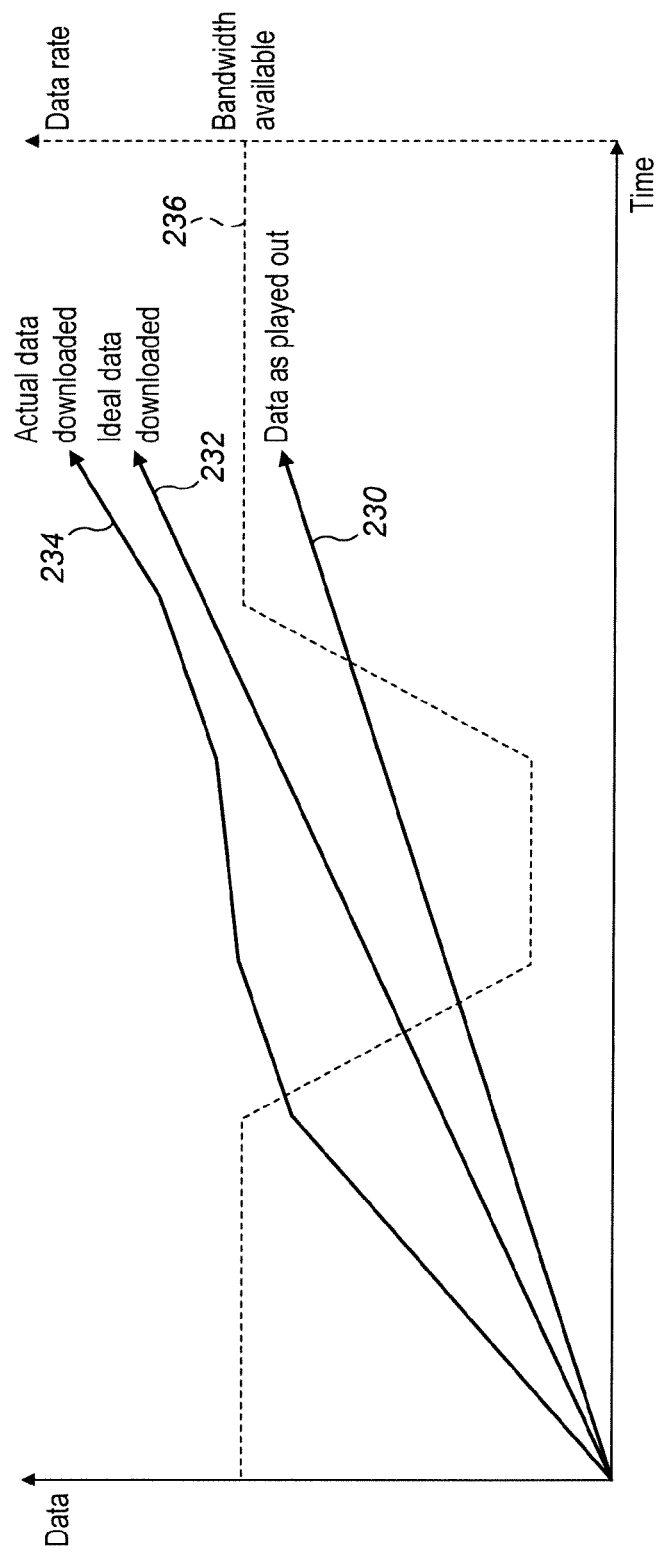
FIG. 14 illustrates an exemplary operation of data transfer relative to available bandwidth.

With respect to FIG. 14, there is illustrated a plot of data rate against time in association with a system such as that shown in FIG. 13. All media serve to in-car consumer devices is routed via the in-car cache server 216 of the in-car system 206. The read ahead controller 218 anticipates degraded network coverage, and increases the rate at which it fills the cache when bandwidth permits.

With reference to FIG. 14, reference numeral 230 illustrates the data rate for data played at a user device. As shown in FIG. 14, this is ideally a linear plot of data against time. Reference numeral 232 shows the ideal data transferred, which again is a linear plot of data against time. Reference numeral 236 shows the bandwidth available over time, which is not constant and as shown has a dip in availability. As a result of this the actual data transfer as illustrated in 234 deviates from the ideal data transfer 232. When availability is good, the data transferred is high, so as to increase the data stored in the cache server 216.

The techniques as described may be used for downloading data or streaming data. Data transfer is a general term encompassing both downloading and streaming.

This description has set out a technique relating to managing downloads related to connectivity. The technique, for example, provides a download function considering upcoming cell phone coverage.

When watching videos on a connected device, or performing some other activity on a device that needs considerable bandwidth, it follows that a connection which suffers from either variable throughput or periods of no connectivity at all can be at best an inconvenience or at worst a critical problem.

In such situations the experience of using an App in general, and certain features in particular, may suffer degradations in performance.

A prominent example is when a user watches a movie on a connected device by streaming the content over the internet. If, during this time, the quality of the connection varies, the user's ability to watch the content is significantly impaired: buffering when the connection is patchy, or stopping altogether when the connection drops entirely.

Another example is when a user wishes to make a phone call from a mobile. Poor network coverage may result in coherent audio or, even worse still, an interrupted call.

The recurring theme here is a connectivity environment that changes in dependence on one or more variables, typically time and/or location.

If it is possible to forecast or predict the connectivity environment in advance, and infer from this the quality of a particular type of connection (3G, 4G, voice etc. . . . ) i.e. the coverage a user may experience during an upcoming period of time, then it should be possible to manage the behavior of the system in a feed-forward manner.

In so doing, the system can try to use the information and plan a system behavior that deals with the problem such that in a time x from now, the user will be in a poor connectivity environment for a duration y.

This behavior and idea of a download function that considers upcoming connectivity can be applied differently and is explained in the following use cases.

A first use case is riding within a car from location A to location B and watching videos during that time. A family is planning to go from A to B. The kids in the back seats are watching a movie from the video-on-demand service to which the family subscribed. This service typically streams the movies to the respective device, which may be a tablet device. The car is a "connected car", meaning that the vehicle itself is internet-connected and can be accessed by the respective consumer devices. In this example the tablets can establish a connection, e.g. a wireless connection to the car system and can exchange information. When the driver starts the journey by entering the destination into the navigation system, the car plans a route accordingly. With this route the system can infer and build up a map of upcoming connectivity quality. Such information is or can be provided by the telephone connectively provider. In that respect after the navigation system has calculated the route, or after each course correction while en-route, the corresponding map of connectivity during the planned trip can be a feature of the navigation system.

In a further embodiment, a map may show areas with poor upcoming connectivity during the journey so that the system may offer to the driver an alternative route with better connectivity similar to the known feature of a navigation system of suggesting the quickest route or the shortest route.

This feature can also sit outside the actual navigation system. In this case the planned route may be transferred to a further application that runs within the connected car. In any case a map of connectivity that shows the quality and level of connectivity in dependence of the time and the progress made along the route is determined and this is used as an input for a corresponding data download function used by an application that needs a certain bandwidth.

The description above are examples for how the information of the planned route is used to determine an anticipated connectivity map which is, in turn, made available to other onboard devices and consumer devices.

Here it is described the example of a video service application that can use all this information to improve a download function that considers the places and respective times during the ride in which the connectivity varies or is lost entirely.

This download function is used to plan a download mechanism that reflects those situations with the result that the movie can be seen without interruptions and with an optimized quality. The following examples describe potential sequences and ways in which the download function can operate.

In a first example, from the planned route the inferred map of connectivity shows that in 10 mins from now the car will come into an area with very low connectivity for 2 minutes. The download function will try to fetch as much data into the cache as is needed to prevent any disruption within this time. The bandwidth for downloading the movie is prioritized so that the need of a stable connection around this period of time is minimized or just removed as the device stores enough to deal with zero bandwidth without interrupting or pausing the movie.

In a second example, alternatively, and in a situation in which the application cannot get additional bandwidth for downloading, a mechanism can be adapted that lowers the bitrate to deal with an anticipated period of poor connectivity. During the remaining time of high bandwidth the download function can lower the bitrate of the movie for a certain period of time. The "saved amount" of bandwidth can be used then to download the portion of the movie and cache it for use within the period of time of poor connectivity. Consequently the movie can also be watched seamlessly without disruption but with a slightly lower bitrate during a certain time that in which the connectivity valley gets compensated. The viewer will get a slightly reduced bandwidth with the benefit of not interrupting the movie.

In a third example, alternatively the system sends a request to the navigation system that due to the downloading process the route should be modified in such a way that during minute 8 to 15 (as an example) the route should be changed accordingly so that the car stays with a certain minimum level of connectivity.

One can imagine that whereas the first and second examples might work more or less autonomously, the third examples would need some kind of acknowledgement from the driver or may be fed into the navigation system of a self-driving car.

A second use case is using the time of the ride for downloading content to watch later on. In another embodiment the intention of the video application is to download a complete item of content or a catalogue of multiple items within a fixed and known period of time, for instance within the duration of the ride. A potential use case is that of a person driving to an airport to catch a flight. The video application provides a service that allows the passenger to watch movies during the flight on his personal device, whereas the application downloads the selected movies in advance of the flight and applies a corresponding rights management mechanism to this. Such applications are known as inflight entertainment systems in connection with a Bring-Your-Own-Device (BYOD) approach—one example of such a service is the Piksel Voyage application. The corresponding embodiment here is that the passenger would like to use the remaining time until the departure of the flight to download the selected content. It can be easily seen that a considerable time in which the connectivity to download gets low can lead to a situation in which the passenger is not able to download all selected content. The download function knows this and reacts accordingly so that the priority for downloading gets increased compared to other applications running on the device. Alternatively the download function operates similarly to the above described examples, e.g. an alternative route is proposed to the driver to ensure the download of the full catalogue while keeping within the timeframe to get the flight.

From an architectural perspective this idea generally combines two applications to share information and work together accordingly. It is the connected car that knows the intended route with all information about time, duration, and which can also provide the map of connectivity. And on the other side it is the video application service that is executed on the smart device of the consumer. In a first embodiment it is the video application that requests information about the connectivity during the journey so that it can plan the download function accordingly. There might be also embodiments in which it is the intelligence of the connected car and appropriate applications running on the processors of the car that execute all those functionalities. In such an embodiment the smart device is just be used as a display device.

In relation to this there are also different architectural aspects to be considered as follows.

As outlined above the connected car runs a navigation system to plan a route to a certain destination. It infers the map of connectivity leading to a time line of connectivity and reachable bandwidth, respectively, that is sent to the smart device of the consumer.

The applications within the smart device of the consumer takes this time line and plans any kind of needed bandwidth accordingly. That means if an application on the devices downloads or streams videos from the internet and needs therefore a certain bandwidth to ensure a seamless experience, the time line is used to plan and manage the download process, like it is described above.

Alternatively, where the car itself provides the anticipation of bandwidth requirements, forecasting of bandwidth availability and caching for in-car consumer devices, it is preferential for the car to provide in-car WiFi. In this way, it can interpose itself between the consumer devices and the remote media servers in such a way as to provide continual service to the in-car devices transparently. This is shown in the example architecture diagram of FIG. 13.

As noted, the in-car consumer devices may use their own cellular connections to intelligently pre-fetch anticipated content but this complicates the arrangement—hence the preference for in-car WiFi. Alternatively, the Cache and Read Ahead Controller may instead be functions built into a standalone consumer device app if adding such features to the car itself is not possible.

The graph of FIG. 14 shows an example data consumption profile for a connected car where a passenger begins watching a movie at the start of a journey. The system forecasts a connectivity difficulty in the middle of the planned journey. In response to this, the system continues to serve the ongoing streaming needs of the passenger's playback device but, in addition to this, loads into the cache data to cover that portion of the video likely to fall within the period of poor quality connectivity.

When the connectivity issue arises, the passenger's device continues to request data as it needs it but instead of fulfilling this from the media server, the in-car cache services it instead.

If there are multiple applications running on the device in parallel, the needed bandwidth is compared against the timeline of reachable bandwidth. If such a comparison shows that there are gaps of connectivity during the time, it can prioritize certain applications to ensure the critical amount of bandwidth for each application.

Another use case is that the calculated download function has to be updated as additional needs of bandwidth come up. An example is a Skype call on the smart device that takes some portion of the bandwidth during the ride. According to the use cases above the download function for the videos to be downloaded has to consider this additional need and react accordingly.

In that respect the realization of such a download function could be integral part of a video application on the smart device that takes the described external information to ensure the needs of displaying or downloading the video without interruption. In such an embodiment it is just applied to the needs of the video downloading process. To do this it can request additional information from other applications that run on the device to update its input data.

In another realization the download function can also be an integral part of the operation system of the device that manages multiple applications on the device that need a certain amount of bandwidth. In such a realization the download function can be applied to all of the executed applications and apply also rules of prioritization. Such rules can be fixed and configured by the operation system. It can be also envisioned that the user of the smart device can set such rules as part of the user profile. In addition the user might be able to change the priorities temporarily to fit with individual needs.

In the description above it is always the download bandwidth that is taken into account for calculating a function to ensure a seamless experience. It has also to be mentioned that the storage of the respective device has to be incorporated into this function as soon as this becomes a limiting factor.

Another architectural aspect lies in the interaction of multiple devices within this environment. In addition to the user's smart device one can also envision an additional storage device that supports the use cases above. It may not be always the smart device on which the content is downloaded. It can also be a companion mobile hard disk drive that is wirelessly connected to the car as well as the smart device of the user. In that respect the hard disk could be target to download the assets. This can be uses for instance to leverage from times in which the user is outside the car. So the "download job" is managed by the car using the storage device as a target.

Consequently this may also be an additional smart device of the user on which the assets gets stored and that does not come with its own internet connection. For instance a user's IPad is target to download, store and display video assets later on whereas the internet connection of the connected car is used to provide, control and manage the download process.

It can be easily seen that multiple devices can be incorporated into this environment. Each device within this environment can therefore be considered with its individual function like storage, display, internet connection etc. A download function can be adapted to consider all of them in an overall manner and to calculate and infer priorities for all the running applications on the multiple devices in relation to a time line in which varying connectivity is given and in which certain downloading processes have to be executed.

The processes as described are preferably implemented on a user device or a central component, such as an in-car system, of a vehicle. The processes are preferably not implemented at a server.

The processes may be implemented on software of a user device or of a central system of a vehicle. The software may be executed by a computer of a user device or of the central system of a vehicle.

The software may be provided on a memory of the user device or on a central system of a vehicle. The software may be provided on a product, such as a USB memory stick, which is accessible to a user device or a central system of an in-vehicle system.

In general the invention has been described by way of reference to particular examples, embodiments and use cases. One skilled in the art will understand that the invention is not limited to any particular example, embodiment or use case as set at hereinabove. In particular one skilled in the art will appreciate that various aspects of the examples given may be combined, and may be implemented either alone or in any combination.

The invention claimed is:

1. A method of delivering content to a device, comprising:
receiving a prediction of a journey of the device, the journey of the device having a plurality of different segments between mapped locations;
determining a communication profile for the device for the journey by mapping the predicted journey against information about connectivity of the segments of the journey;
receiving an identification of content to be transferred to the device; and
planning a data transfer to the device in dependence on the determined communication profile for the journey and the identified content to be transferred to the device during the journey; and
determining, for each segment of the journey, if a data transfer rate is sufficient to allow download of the identified content to meet a playback rate for that segment, and responsive to determining that the data transfer rate is not sufficient for that segment, performing at least one of the steps of:
changing at least one of the mapped locations associated with that segment in order to replace that segment with a new segment having an increased data transfer rate; and
decreasing a playback rate in a preceding segment to allow an increased data transfer rate in the preceding segment to cache content for playback in that segment.

2. The method of claim 1 wherein the communication profile is a data connectivity of the device for the journey.

3. The method of claim 1 wherein the step of planning the data transfer to the device comprises determining a varying of the rate for transferring content.

4. The method of claim 1 wherein the step of planning the data transfer comprises varying a transfer rate of content to ensure that the identified content will be transferred completely during a period of time of the predicted journey.

5. The method of claim 1 wherein the step of planning the data transfer comprises varying a transfer bit rate for the content to ensure that the identified content can be consumed in accordance with a playback rate in a specified time period.

6. The method of claim 1 wherein the step of determining the communication profile comprises mapping the segments of the journey against information about connectivity of the mapped locations.

7. The method of claim 1 wherein the data transfer is adjusted if an actual communication profile during transferring the content does not match with the determined communication profile.

8. The method of claim 1 wherein the step of planning the data transfer comprises reducing a playback rate of the identified content in a current segment, thereby requiring a reduced data transfer rate.

9. The method of claim 1 wherein changing at least one of the mapped locations changes a time period associated with the journey.

10. The method of claim 1 wherein the step of planning the data transfer comprises increasing a data transfer rate in one period of time to compensate for a reduced data transfer rate in a later period of time.

11. The method of claim 1 wherein the step of planning the data transfer comprises decreasing a playback rate in one period of time to allow the same playback rate in a later period of time in which the data transfer rate is not sufficiently large.

12. The method of claim 1 wherein the step of planning the data transfer is in further dependence on a communication associated with a further application requiring access to the device and consuming part of an available transfer rate to the device.

13. The method of claim 1 wherein the step of planning the data transfer comprises downloading a content required for playback prior to a playback period.

14. The method of claim 1 wherein the step of planning the data transfer comprises streaming a content required for playback such that a portion of the content to be played back is transferred prior to it being played back.

15. The method of claim 1 wherein the step of planning the data transfer comprises varying a transfer rate differently for different time periods during which the content is one or both of transferred and accessed for playback.

16. The method of claim 1 in which the device is a system device connected, in an environment, to a plurality of user devices, the method further comprising:
   receiving, at the system device, content transferred from a remote content provider;
   delivering, from the system device, the transferred content to one or more of the plurality of user devices;
   receiving a prediction of a context of the environment during a time period;
   receiving an indication of the content to transfer to the one more of the user devices during the time period; and
   planning a transfer of content from the remote device to the system device for the time period in dependence on the prediction and the indication.

17. A device for receiving content, comprising:
an interface for receiving a prediction of a journey of the device, the journey of the device having a plurality of different segments between mapped locations;
a processor configured to determine a communication profile for the device for the journey by mapping the predicted journey against information about connectivity of the segments of the journey; and
an interface for receiving an identification of content to be transferred to the device, wherein the processor is further configured to:
plan a data transfer to the device in dependence on the communication profile of the predicted journey and the identified content;
determine, for each segment of the journey, if a data transfer rate is sufficient to allow download of the identified content to meet a playback rate for that segment, and responsive to determining that the data transfer rate is not sufficient for that segment, perform at least one of:
   change at least one of the mapped locations associated with that segment in order to replace that segment with a new segment having an increased data transfer rate; and
   decrease a playback rate in a preceding segment to allow an increased data transfer rate in the preceding segment to cache content for playback in that segment.

18. A system comprising:
a device according to claim 17 configured to:
   receive content transferred from a remote device;
   deliver the received content to one or more playback devices connected to the device according to claim 17;
   receive a prediction of a context of an environment in which the device according to claim 17 will be in during a predicted time period;
   receive an indication of content to transfer to the one or more playback devices during the predicted time period; and
   plan a transfer of content from the remote device to the device according to claim 17 for the predicted time period in dependence on the predicted context and the identified content.

* * * * *